US007965412B2

(12) United States Patent
Liu (10) Patent No.: US 7,965,412 B2
(45) Date of Patent: Jun. 21, 2011

(54) IMAGE PROCESSING SYSTEM AND METHOD THEREOF FOR PROCESSING AN IMAGE DATA

(75) Inventor: Ming-Fon Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 294 days.

(21) Appl. No.: 11/356,071

(22) Filed: Feb. 17, 2006

(65) Prior Publication Data

US 2010/0296110 A1 Nov. 25, 2010

(51) Int. Cl.
*H04N 1/60* (2006.01)
(52) U.S. Cl. ........ 358/1.9; 358/3.26; 358/515; 358/529; 345/589; 345/592; 345/629
(58) Field of Classification Search .............. 358/1.9, 358/3.26, 3.29, 515, 518, 529; 382/162, 382/164, 167, 274, 284, 294; 345/419, 423, 345/426, 589, 592, 629
See application file for complete search history.

(56) References Cited

U.S. PATENT DOCUMENTS

| 5,313,570 | A | * | 5/1994 | Dermer et al. | 382/164 |
|---|---|---|---|---|---|
| 5,444,835 | A | * | 8/1995 | Turkowski | 345/592 |
| 5,613,046 | A | * | 3/1997 | Dermer | 358/1.9 |
| 5,668,931 | A | * | 9/1997 | Dermer | 358/1.9 |
| 5,960,163 | A | * | 9/1999 | Nickell et al. | 358/1.9 |
| 6,809,839 | B1 | * | 10/2004 | Earl et al. | 358/1.9 |
| 7,355,749 | B2 | * | 4/2008 | Nishide et al. | 358/1.9 |
| 7,777,758 | B2 | * | 8/2010 | Yhann et al. | 382/274 |
| 2004/0160616 | A1 | * | 8/2004 | Huang et al. | 358/1.9 |
| 2006/0033971 | A1 | * | 2/2006 | Allen | 358/537 |
| 2006/0087698 | A1 | * | 4/2006 | Allen | 358/3.26 |
| 2008/0088643 | A1 | * | 4/2008 | Yhann et al. | 382/284 |

\* cited by examiner

*Primary Examiner* — Kimberly A Williams
(74) *Attorney, Agent, or Firm* — Kirton & McConkie; Evan R. Witt (57) ABSTRACT

A processing system includes a setting module for capturing Cyan, Magenta, Yellow and K data of a foreground and selecting one from the Cyan, Magenta, Yellow and K data in order to set gray values of remaining three of the Cyan, Magenta, Yellow and K data as "0"; a coupler module for capturing the Cyan, Magenta, Yellow and K data of the background and combining the Cyan data of the foreground and background into a Cyan data group, the Magenta data of the foreground and background into a Magenta data group, the Yellow data of the foreground and background into a Yellow data group and the K data of the foreground and background into a K data group; and a print module for printing, out the Cyan, Magenta, Yellow and K data groups one above another in an overlapping manner.

8 Claims, 8 Drawing Sheets

IMAGE PROCESSING SYSTEM AND METHOD THEREOF FOR PROCESSING AN IMAGE DATA

FIELD OF THE INVENTION

The invention relates to a processing system and the method thereof, more particularly to an image processing system for use in a printing device and the method for processing an image within the printing device.

BACKGROUND OF THE INVENTION

A printing device generally prints an image on a piece of paper upon receipt of an instruction. Firstly, the image data is analyzed into three basic colors (Red, Green and Blue) and is later converted into C, M, Y, K printing colors by the Color Management Module so that the Cyan, Magenta, Yellow and K colors are printed on the paper in an overlapping manner. The final product (the printout) therefore has CMYK colors.

Figure 1:
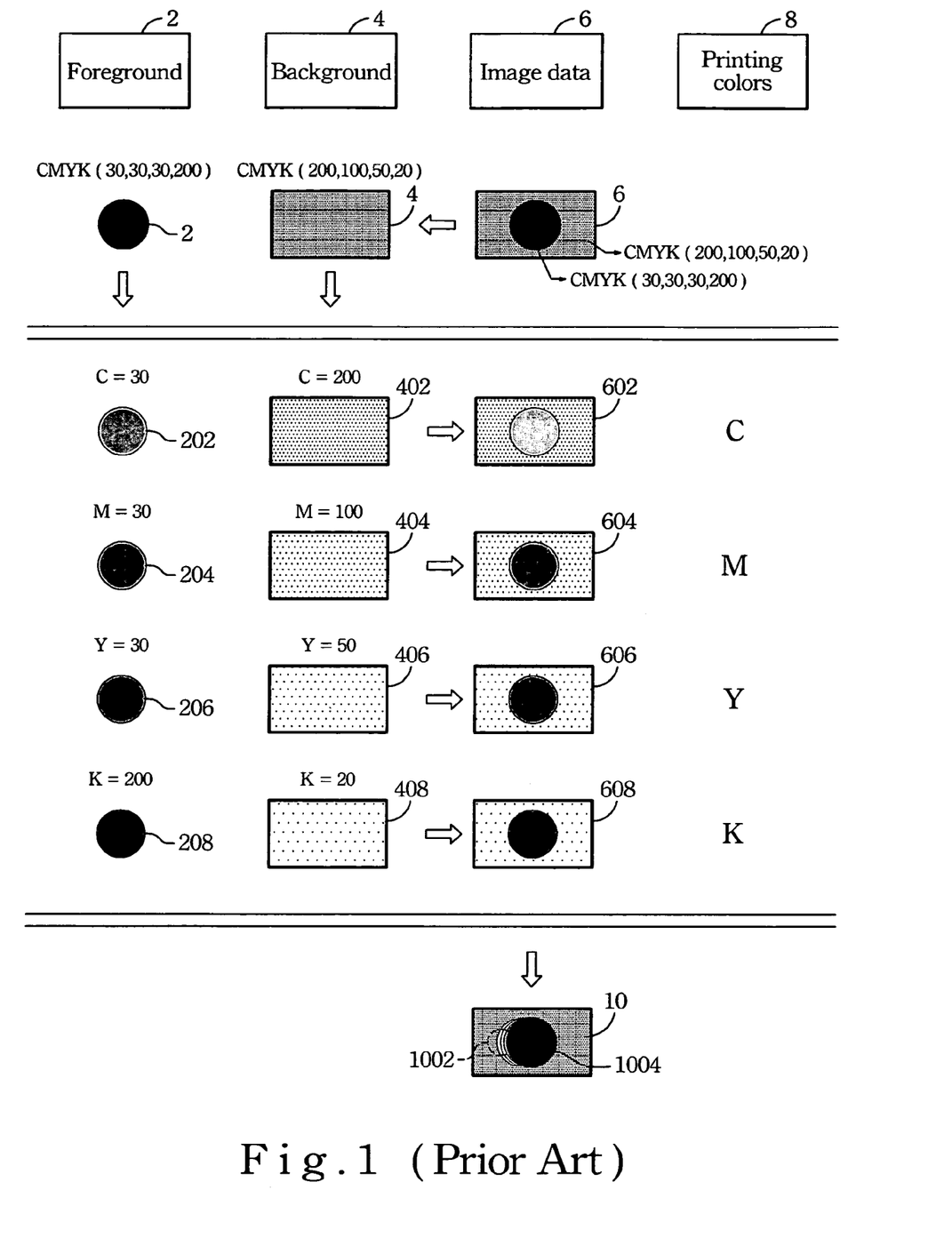
FIG. 1 is a conventional technique illustrating how a foreground and a background of an image data are printed in an overlapping manner to produce a printout.

Referring to FIG. 1, in the conventional printing process, the image data 6 can be divided into a foreground data 2 and a background data 4 which are respectively converted by the CMM into C, M, Y, K printing colors 8 such that the foreground data 2 is formed by a Cyan data 202 (gray value 30), a Magenta data 204 (gray value 30), a Yellow data 206 (gray value 30) and a K data 208 (gray value 200) while the background data 4 is formed by a Cyan data 402 (gray value 200), a Magenta data 404 (gray value 100), a Yellow data 406 (gray value 50) and a K data 408 (gray value 200).

In order to print out the foreground 1004 of an image 10, a predetermined color (K in the drawing) is selected from the printing colors 8 such that the Cyan data 202, 402 of the foreground and background are converted into the Cyan data group 602, the Magenta data 204, 404 of the foreground and background into the Magenta data group 604, the Yellow data 206, 406 of the foreground and background into the Yellow data group 606, the K data 208, 408 22 of the foreground and background into the K data group 608.

The Cyan data group 602, the Magenta data group 604, the Yellow data group 606 and the K data group 608 are later printed one above another in the overlapping manner in order to achieve the image 10 (the printout).

As shown in FIG. 1, a shadow 1002 or silhouette may appear around the peripheral portion of the foreground 1004 of the printout 10 when there is misregistration due to shifting of paper or the color-applying plate during overprinting operation of the Cyan data group 602, the Magenta data group 604, the Yellow data group 606 and the K data group 608 one above another.

Figure 2:
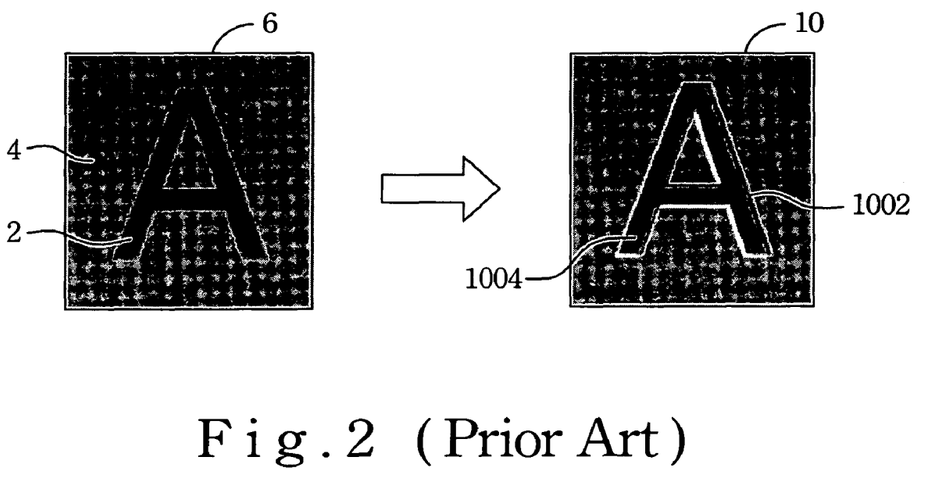
FIG. 2 is the conventional technique illustrating how the foreground and background of the image data are printed to produce the printout.

FIG. 2 illustrates how a conventional printing technique prints an image data 6 into a printout 10. The image data 6 can be divided into a foreground 2 and a background 4. When the image data 6 is printed out as illustrated in FIG. 1, there may appear a shadow 1002 or a silhouette around the peripheral portion of the foreground 1004 of the printout 10 due to shifting of the paper or the color-applying plate.

To eliminate the aforesaid drawback caused by the conventional printing technique, trapping is usually done (printing small areas of overlapping colors where the foreground and background meet) to compensate the misregistration.

SUMMARY OF THE INVENTION

The object of the present invention is to provide an image processing system and the method thereof to overcome the disadvantages encountered during use of the conventional printing process such that the printout is clear of the aforesaid shadow.

In one aspect of the present invention, processing method is proposed for processing an image data within a printing device that produces the image data as a printout, the image data including a foreground and a background, each of which is formed by a combination of Cyan data, Magenta data, Yellow data and K (black) data and each of which is to be printed by a combination of CMYK (Cyan, Magenta, Yellow and Black) color elements. The processing method includes the steps: (a) capturing the Cyan data, the Magenta data, the Yellow data and the K data of the foreground; (b) selecting one from, the Cyan data, the Magenta data, the Yellow data and the K data of the foreground in order to set gray values of remaining three of the Cyan data, the Magenta data, the Yellow data and the K data of the foreground as "0"; (c) capturing the Cyan data, the Magenta data, the Yellow data and the K data of the background; (d) combining the Cyan data of the foreground and background into a Cyan data group, the Magenta data of the foreground and background into a Magenta data group, the Yellow data of the foreground and background into a Yellow data group and the K data of the foreground and background into a K data group respectively; and (e) printing the Cyan data group, the Magenta data group, the Yellow data group and the K data group one above another in an overlapping manner within the printing device in order to achieve the printout.

In a second aspect of the present invention, an image processing system is proposed for processing an image data within a printing device that produces the image data as a printout, the image data including a foreground and a background, each of which is formed by a combination of Cyan data, Magenta data, Yellow data and K (black) data and each of which is to be printed by a combination of CMYK (Cyan, Magenta, Yellow and Black) color elements. The image processing system includes: a foreground setting module for capturing the Cyan data, the Magenta data, the Yellow data and the K data of the foreground and selecting one from the Cyan data, the Magenta data, the Yellow data and the K data of the foreground in order to set gray values of remaining three of the Cyan data, the Magenta data, the Yellow data and the K data of the foreground as "0"; a coupler module for capturing the Cyan data, the Magenta data, the Yellow data and the K data of the background and combining the Cyan data of the foreground and background into a Cyan data group, the Magenta data of the foreground and background into a Magenta data group, the Yellow data of the foreground and background into a Yellow data group and the K data of the foreground and background into a K data group respectively; and a print module for printing the Cyan data group, the Magenta data group, the Yellow data group and the K data group one above another in an overlapping manner within the printing device in order to achieve the printout.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

Figure 3:
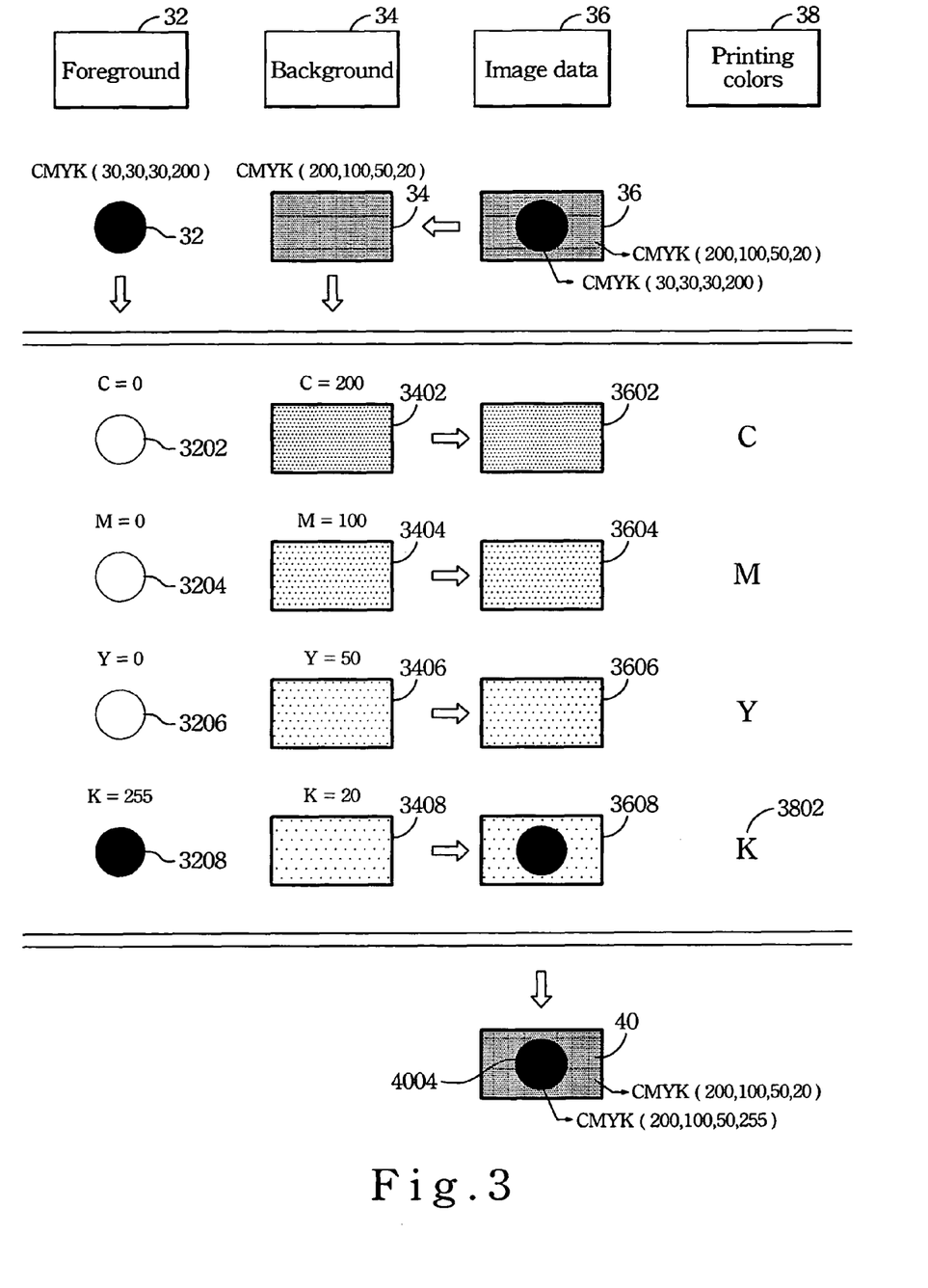
FIG. 3 illustrates how a foreground and a background of an image data are printed in an overlapping manner to produce a printout by the image processing system of the present invention.

FIG. 3 illustrates how a foreground and a background of an image data 36 are printed in an overlapping manner to produce a printout 40 by the image processing system 30 of the present invention. The image data 36 is to be printed by a combination of CMYK (Cyan, Magenta, Yellow and Black) color elements 38 and is formed by a combination of the Cyan data 3602, the Magenta data 3604, the Yellow data 3606) and the K (black) data 3608.

The image data 36 generally includes a foreground 32 and a background 34. When it is desired to print the foreground 32, a color data 3802 (K in the drawing) is selected from the printing colors 38.

The foreground 32 is formed by a combination of the Cyan data 3202, the Magenta data 3204, the Yellow data 3206, and the K (black) data 3208, 3408 and is to be printed by a combination of CMYK (Cyan, Magenta, Yellow and Black) color elements 38. The background 34 is formed by a combination of the Cyan data 3402, the Magenta data 3404, the Yellow data 3406 the K (black) data 3408 and is to be printed by a combination of CMYK (Cyan, Magenta, Yellow and Black) color elements 38.

Figure 4:
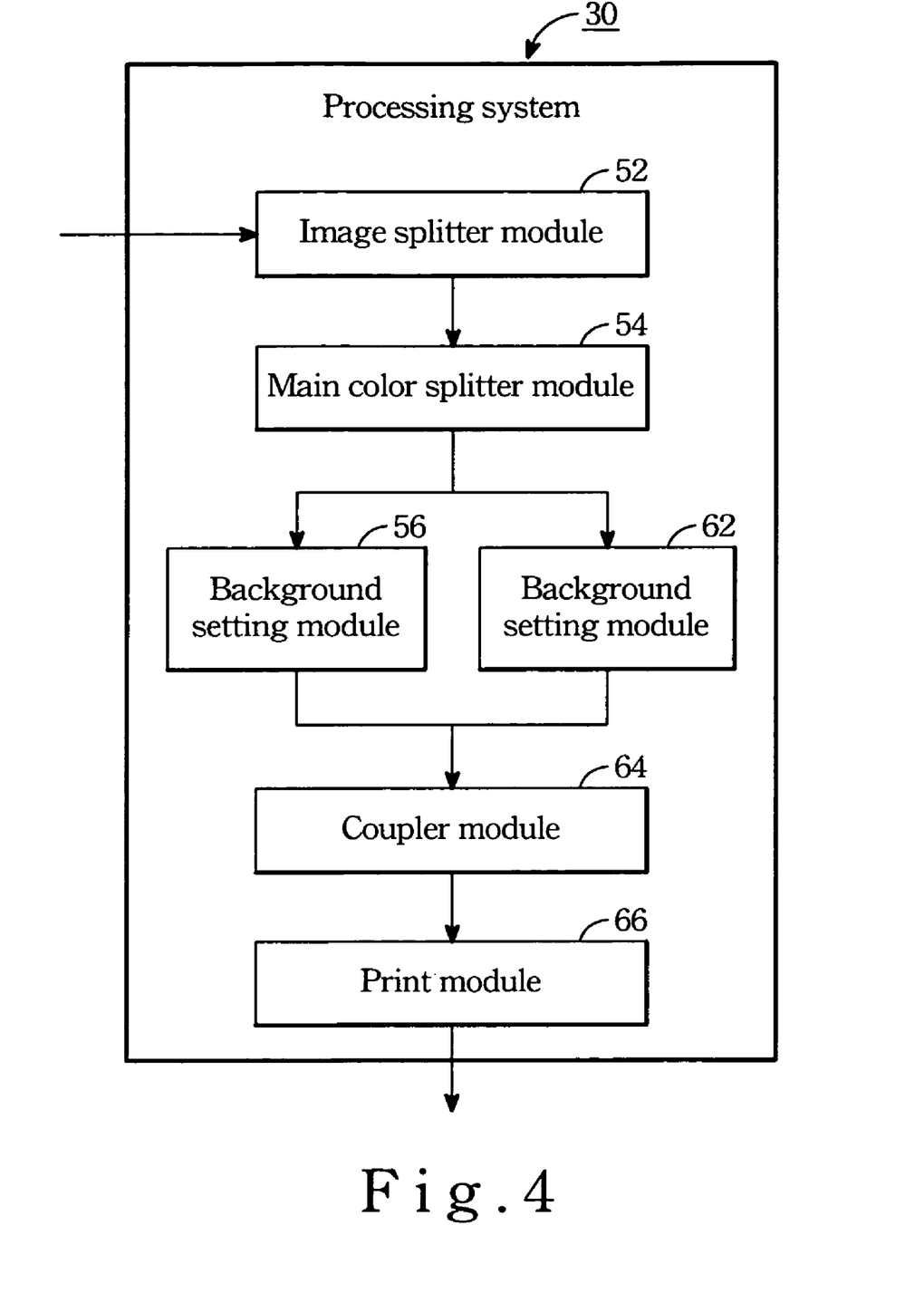
FIG. 4 is a block diagram representing the image processing system of the present invention.
Figure 5:
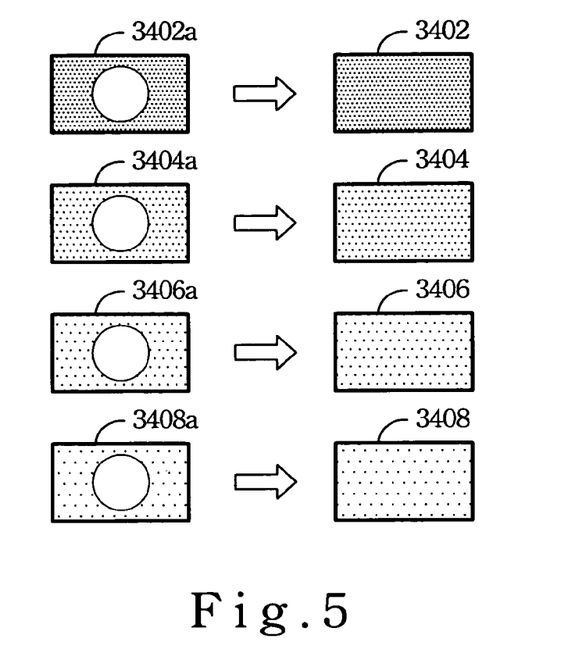
FIG. 5 shows how a predetermined background is converted into the background of the image data in the image processing system of the present invention.

Referring to FIGS. 4, 5 and 3, the image processing system 30 according to the present invention includes an image splitter module 52, a main color splitter module 54, a background setting module 56, a foreground setting module 62, a coupler module 64, and a print module 66.

The image splitter module 52 splits the image data 36 into the foreground 32 and a predetermined background 34.

The main color splitter module 54 splits the foreground 32 in order to achieve the Cyan data 3202, the Magenta data 3204, the Yellow data 3206 and the K data 3208 respectively, and the predetermined background 34 in order to achieve a predetermined Cyan data 3402a, a predetermined Magenta data 3404a, a predetermined Yellow data 3406a and a predetermined K data 3408a, respectively.

Later, the background setting module 56 replaces the gray values of the predetermined Cyan data 3402a of the predetermined background 34 with that of the Cyan data of the background in order to achieve the Cyan data 3402 of the background, the predetermined Magenta data 3404a of the predetermined background 34 with that of the Magenta data of the background in order to achieve the Magenta data 3404 of the background.

In the aforesaid manner the predetermined Yellow data 3406a of the predetermined background is replaced with that of the Yellow data of the background in order to achieve the Yellow data 3406 of the background, and the predetermined K data 3408a of the predetermined background with that of the K data of the background in order to achieve the K data 3408 of the background.

In addition, the Cyan data 3202, the Magenta data 3204, the Yellow data 3206 and the K data 3208 of the foreground 32 are captured. Except the gray value of the selected K data 3802 of the foreground 32, the foreground setting module 62 set up the gray values of the Cyan data 3202, the Magenta data 3204 and the Yellow data 3206 the foreground 32 as "0" respectively.

The coupler module 64 captures the Cyan data 3402, the Magenta data 3404, the Yellow data 3406 and the K data 3408 of the background and combines the Cyan data 3202, 3402 of the foreground 32 and background 34 into a Cyan data group 3602. The Magenta data 3204, 3404 of the foreground 32 and background 34 are combined a Magenta data group 3604. The Yellow data 3206 of the foreground 32 and background 34 are combined into a Yellow data group 3606. The K data 3208, 3408 of the foreground 32 and background 34 are combined into a K data group 3608.

Finally, the print module 66 prints the Cyan data group 3602, the Magenta data group 3604, the Yellow data group 3606 and the K data group 3608 one above another in an overlapping manner (over-print) within the printing device (not shown) in order to achieve the printout 40. Since there is no trapping among the overlapping areas of the Cyan data 3402, the Magenta data 3404, the Yellow data 3406 and the K data 3408 of the background 34, the printout 40 is clear from what is so-called shadow, as encountered in the prior art printing technique.

Figure 6:
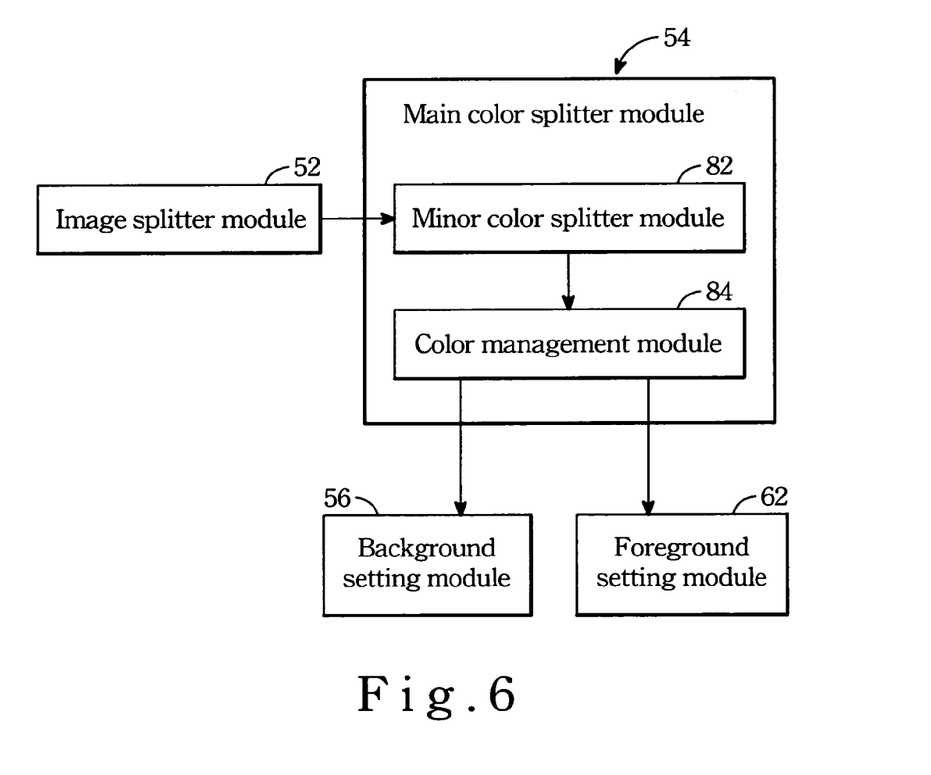
FIG. 6 illustrates how a color splitter module processes the basic colors in the image processing system of the present invention.
Figure 7:
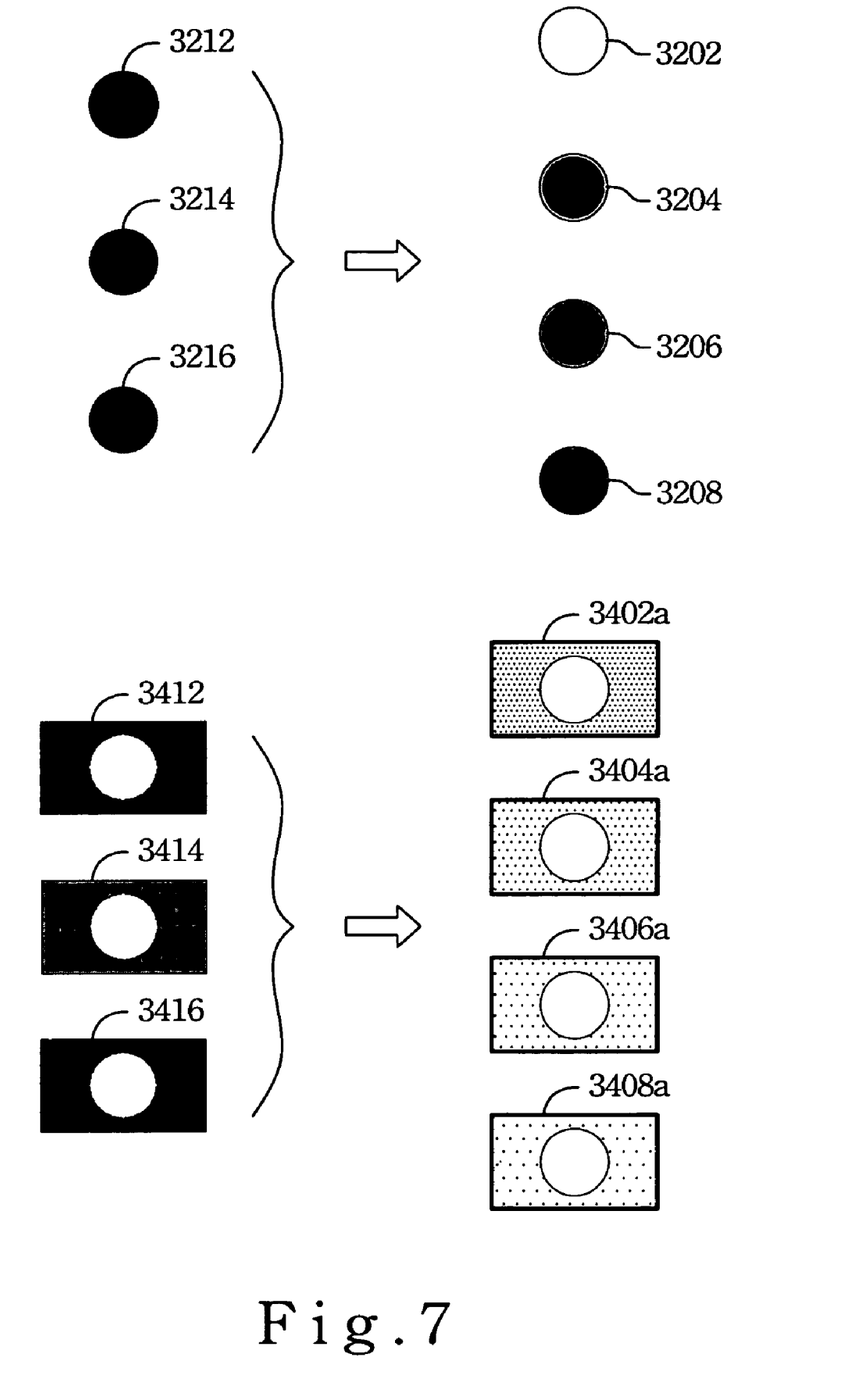
FIG. 7 illustrates how the basic colors are converted into the printing colors in the image processing system of the present invention.

Referring to FIGS. 6 and 7, wherein FIG. 6 illustrates how the main color splitter module 54 processes the basic colors while FIG. 7 illustrates how the basic colors are converted into the printing colors 38. The main color splitter module 54 further includes a minor color splitter module 82 and a color management module 84.

The minor color splitter module 82 analyzes the image data 36 into RBG basic colors. The image splitter module 52 splits the foreground 32 of the image data 36 into the RGB basic colors and the predetermined background 34 into the RGB basic colors.

The CMM 84 (color management module) converts the RBG basic colors of the foreground 32 into the Cyan data 3202, the Magenta data 3204, the Yellow data 3206 and the K data 3208, and the RGB basic colors and the predetermined background 34 into the predetermined Cyan data 3402a, the predetermined Magenta data 3404a, the predetermined Yellow data 3406a and the predetermined K data 3408a.

In this embodiment, the gray value of the K data 3802 of the foreground 32 is set by the foreground setting module 62 to be maximum (i.e. 255) while the gray values the Cyan data 3202, the Magenta data 3204 and the Yellow data 3206 of the foreground 32 are set as "0" respectively. Under this condition, when the foreground 32 of the printout 40 is printed, the foreground in the printout 40 provides fine sharpness with respect to the background. Since the printout 40 is usually a text or a picture, color black is generally preferred to and is selected in order to provide the outmost sharpness of the text. However, the selected color 3802 of the foreground 32 can be one of the remaining three printing colors 38 (C, M or Y) and its gray value can be varied according to the desired object.

Figure 8:
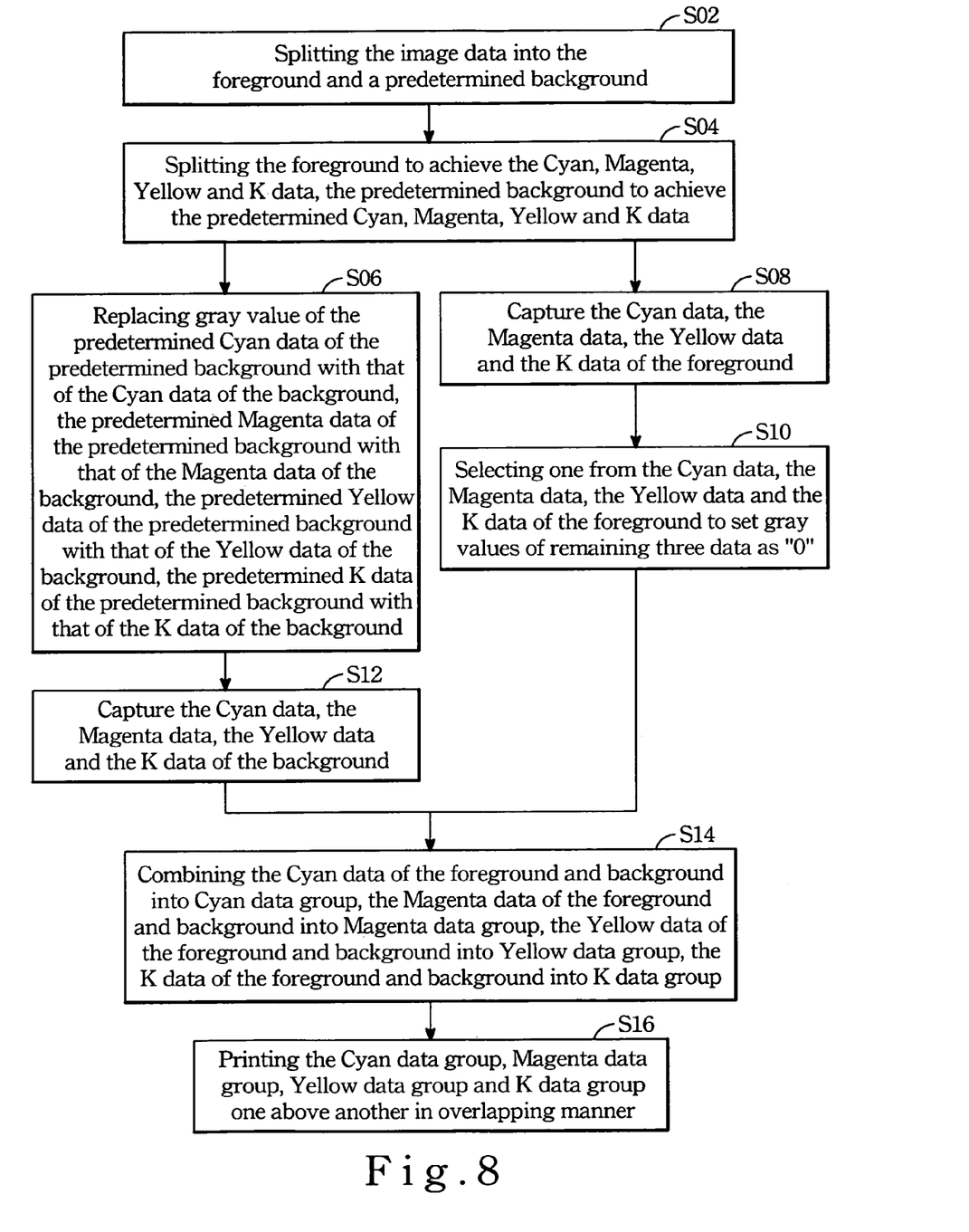
FIG. 8 is a block diagram illustrating the steps during processing of the image data in the image processing system of the present invention.

FIG. 8 is a block diagram illustrating the steps during processing of the image data in the image processing system 30 of the present invention.

Step 02: the image data is split into the foreground 32 and a predetermined background.

Step S04: the foreground 32 is split in order to achieve the Cyan data 3202, the Magenta data 3204, the Yellow data 3206 and the K data 3208 respectively. The predetermined background is also split in order to achieve the predetermined Cyan data 3402a, the predetermined Magenta data 3404a, the predetermined Yellow data 3406a and the predetermined K data 3408a, respectively.

Step 06: the gray value of the predetermined Cyan data 3402a of the predetermined background is replaced with that of the Cyan data of the background in order to achieve the Cyan data 3402 of the background 34, the predetermined Magenta data 3404a of the predetermined background with that of the Magenta data of the background in order to achieve the Magenta data 3404 of the background 34, the predetermined Yellow data 3406a of the predetermined background with that of the Yellow data of the background in order to achieve the Yellow, data 3406 of the background 34, and the predetermined K data 3408a of the predetermined background with that of the K data of the background in order to achieve the K data 3408 of the background 34.

Step S08: the Cyan data 3202, the Magenta data 3204, the Yellow data 3206 and the K data 3208 of the foreground 32 are captured respectively.

Step S10: one printing data 3802 is selected from the Cyan data 3202, the Magenta data 3204, the Yellow data 3206 and the K data 3208 of the foreground 32 in order to set gray values of remaining three of the Cyan data 3202, the Magenta data 34204, the Yellow data 3206 and the K data 3208 of the foreground 32 as "0". The selected data is 3802, and has the maximum gray value (i.e. 255).

Step S12: the Cyan data 3402, the Magenta data 3404, the Yellow data 3406 and the K data 3408 of the background 34 are captured respectively.

Step S14: the Cyan data 3202, 3402 of the foreground 32 and background 34 are combined into a Cyan data group 3602, the Magenta data 3204, 3404 of the foreground 32 and background 34 into a Magenta data group 3604, the Yellow data 3206, 3406 of the foreground 32 and background 34 into a Yellow data group 3606 and the K data 3208, 3408 of the foreground 32 and background 34 into a K data group 3608, respectively.

Step S16: the Cyan data group 3602, the Magenta data group 3604, the Yellow data group 3606 and the K data group 3608 are printed one above another in an overlapping manner within the printing device in order to achieve the printout 40.

Figure 9:
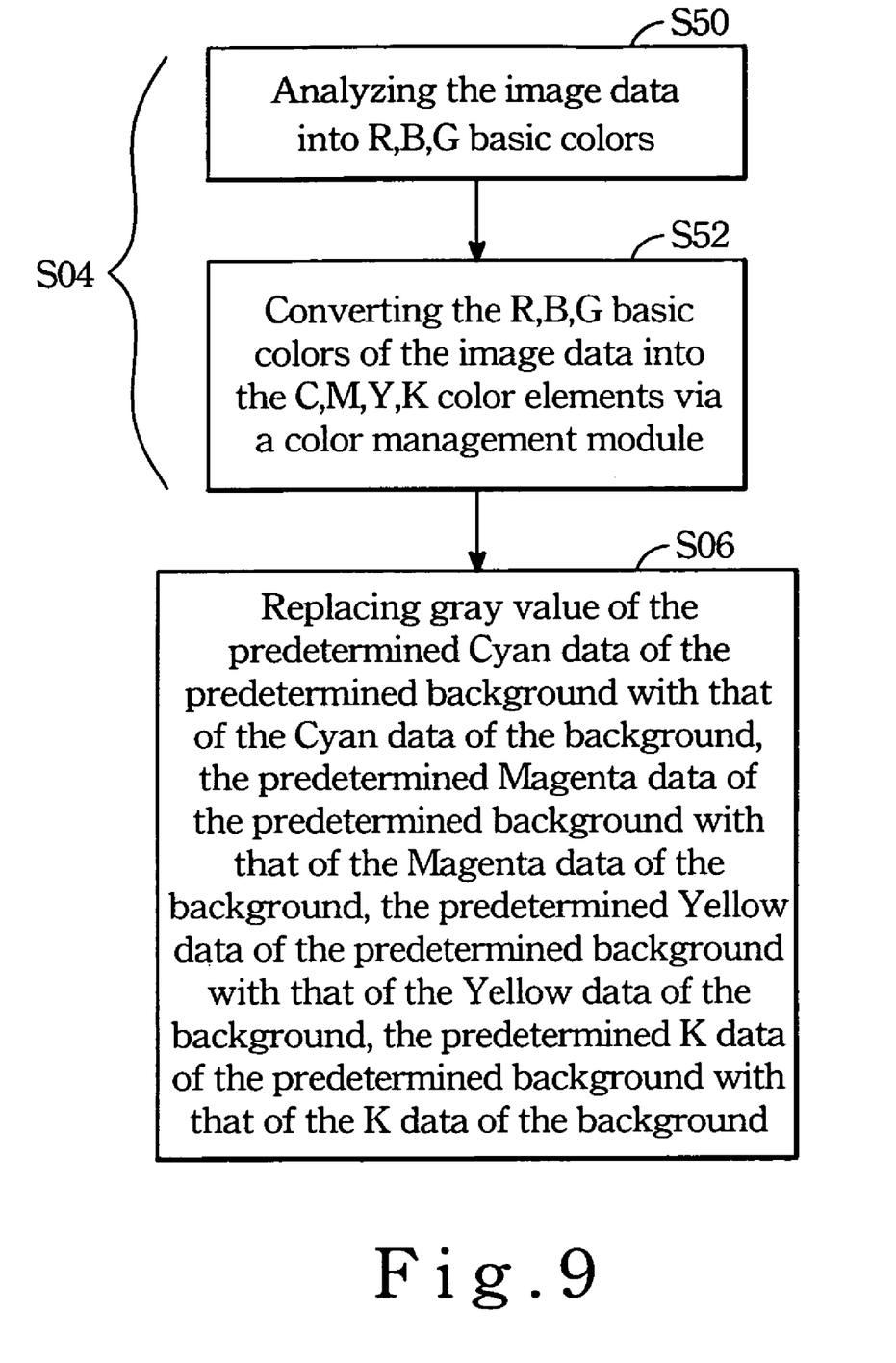
FIG. 9 is a block diagram illustrating the steps to conduct before conducting a selected step in FIG. 8.

FIG. 9 is a block diagram illustrating the steps to conduct before conducting the step S04 in FIG. 8.

Step S50: the image data 36 can be analyzed into RBG basic colors. Thus, the foreground 32 and the predetermined background 34 are analyzed in order to achieve the basic colors (R, G, B).

Step S52: the RBG basic colors of the image data 36 are converted into the CMYK (Cyan, Magenta, Yellow and Black) color elements via a CMM 84 (color management module). Afterward, the Step S06 follows.

To summarize the above paragraphs, it is observable that in the color processing system 30 of the present invention, since only the desired gray value of the selected printing color 3802 is maintained during the printing operation, there is no misregistration in applying printing colors. Therefore, the printout 40 does not have shadow around the peripheral portion of the foreground.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A processing method for processing an image data within a printing device that produces the image data as a printout, the image data including a foreground and a background, each of which is formed by a combination of Cyan data, Magenta data, Yellow data and K (black) data and each of which is to be printed by a combination of CMYK (Cyan, Magenta, Yellow and Black) color elements, the processing method comprising the steps:
   (a) capturing the Cyan data, the Magenta data, the Yellow data and the K data of the foreground;
   (b) selecting one from the Cyan data, the Magenta data, the Yellow data and the K data of the foreground in order to set gray values of remaining three of the Cyan data, the Magenta data, the Yellow data and the K data of the foreground as "0";
   (c) capturing the Cyan data, the Magenta data, the Yellow data and the K data of the background;
   (d) combining the Cyan data of the foreground and background into a Cyan data group, the Magenta data of the foreground and background into a Magenta data group, the Yellow data of the foreground and background into a Yellow data group and the K data of the foreground and background into a K data group respectively;
   (e) printing the Cyan data group, the Magenta data group, the Yellow data group and the K data group one above another in an overlapping manner within the printing device in order to achieve the printout;
   (f) splitting the image data into the foreground and a predetermined background;
   (g) splitting the foreground in order to achieve the Cyan data, the Magenta data, the Yellow data and the K data respectively and the predetermined background in order to achieve a predetermined Cyan data, a predetermined Magenta data, a predetermined Yellow data and a predetermined K data, respectively; and
   (h) replacing gray value of the predetermined Cyan data of the predetermined background with that of the Cyan data of the background in order to achieve the Cyan data of the background, the predetermined Magenta data of the predetermined background with that of the Magenta data of the background in order to achieve the Magenta data of the background, the predetermined Yellow data of the predetermined background with that of the Yellow data of the background in order to achieve the Yellow data of the background, and the predetermined K data of the predetermined background with that of the K data of the background in order to achieve the K data of the background.

2. The processing method according to claim 1, wherein said selected one from the Cyan data, the Magenta data, the Yellow data and the K data of the foreground has a maximum gray value.

3. The processing method according to claim 1, wherein said selected one from the Cyan data, the Magenta data, the Yellow data and the K data of the foreground is a black color.

4. The processing method according to claim 1, further comprising the following steps prior to the step (a):
   (i) analyzing the image data into RBG basic colors; and (ii) converting the RBG basic colors of the image data into the CMYK (Cyan, Magenta, Yellow and Black) color elements via a CMM (color management module).

5. An image processing system for processing an image data within a printing device that produces the image data as a printout, the image data including a foreground and a background, each of which is formed by a combination of Cyan data, Magenta data, Yellow data and K (black) data and each of which is to be printed by a combination of CMYK (Cyan, Magenta, Yellow and Black) color elements, the image processing system comprising:

a foreground setting module for capturing the Cyan data, the Magenta data, the Yellow data and the K data of the foreground and selecting one from the Cyan data, the Magenta data, the Yellow data and the K data of the foreground in order to set gray values of remaining three of the Cyan data, the Magenta data, the Yellow data and the K data of the foreground as "0";

a coupler module for capturing the Cyan data, the Magenta data, the Yellow data and the K data of the background and combining the Cyan data of the foreground and background into a Cyan data group, the Magenta data of the foreground and background into a Magenta data group, the Yellow data of the foreground and background into a Yellow data group and the K data of the foreground and background into a K data group respectively;

a print module for printing the Cyan data group, the Magenta data group, the Yellow data group and the K data group one above another in an overlapping manner within the printing device in order to achieve the printout;

an image splitter module for splitting the image data into the foreground and a predetermined background;

a main color splitter module for splitting the foreground in order to achieve the Cyan data, the Magenta data, the Yellow data and the K data respectively and the predetermined background in order to achieve a predetermined Cyan data, a predetermined Magenta data, a predetermined Yellow data and a predetermined K data respectively; and a background setting module for replacing gray values of the predetermined Cyan data of the predetermined background with that of the Cyan data of the background in order to achieve the Cyan data of the background, the predetermined Magenta data of the predetermined background with that of the Magenta data of the background in order to achieve the Magenta data of the background, the predetermined Yellow data of the predetermined background with that of the Yellow data of the background in order to achieve the Yellow data of the background, and the predetermined K data of the predetermined background with that of the K data of the background in order to achieve the K data of the background.

6. The image processing system according to claim 5, further comprising:

a minor color splitter module for analyzing the image data into RBG basic colors; and a CMM (color management module) for converting the RBG basic colors of the image data into the CMYK (Cyan, Magenta, Yellow and Black) color elements.

7. The image processing system according to claim 5, wherein said selected one from the Cyan data, the Magenta data, the Yellow data and the K data of the foreground has a maximum gray value.

8. The image processing system according to claim 5, wherein said selected one from the Cyan data, the Magenta data, the Yellow data and the K data of the foreground is a black color.

* * * * *